Figure 4:
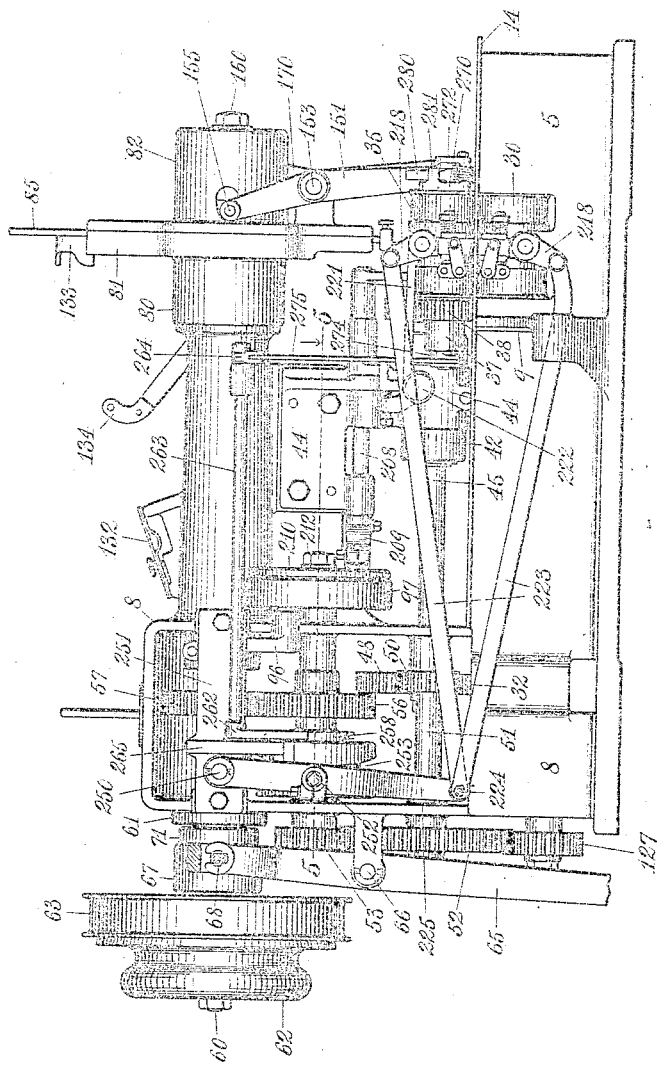

A. A. STURTEVANT & W. H. HONISS.
PAMPHLET STITCHING MACHINE.
APPLICATION FILED MAY 29, 1902.
1,114,063.
Patented Oct. 20, 1914.
10 SHEETS—SHEET 1.
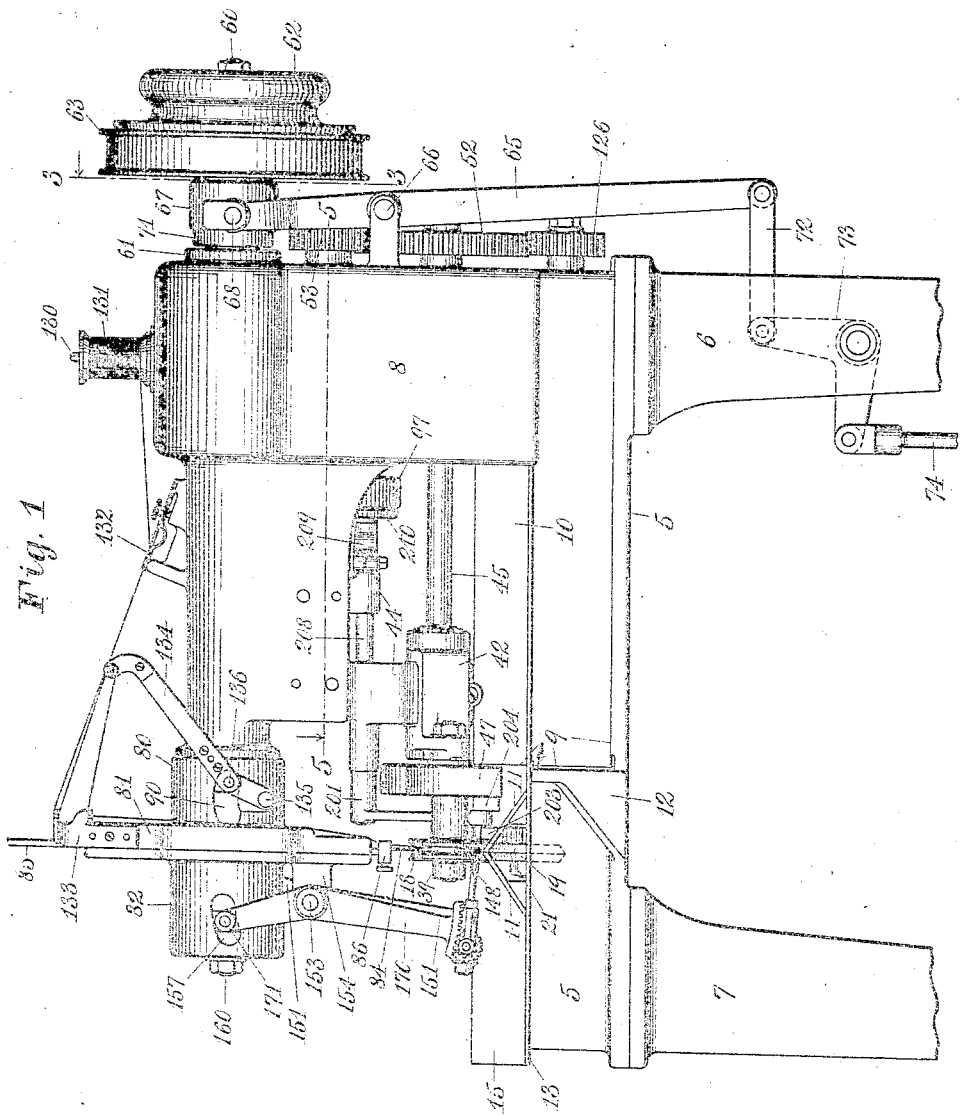

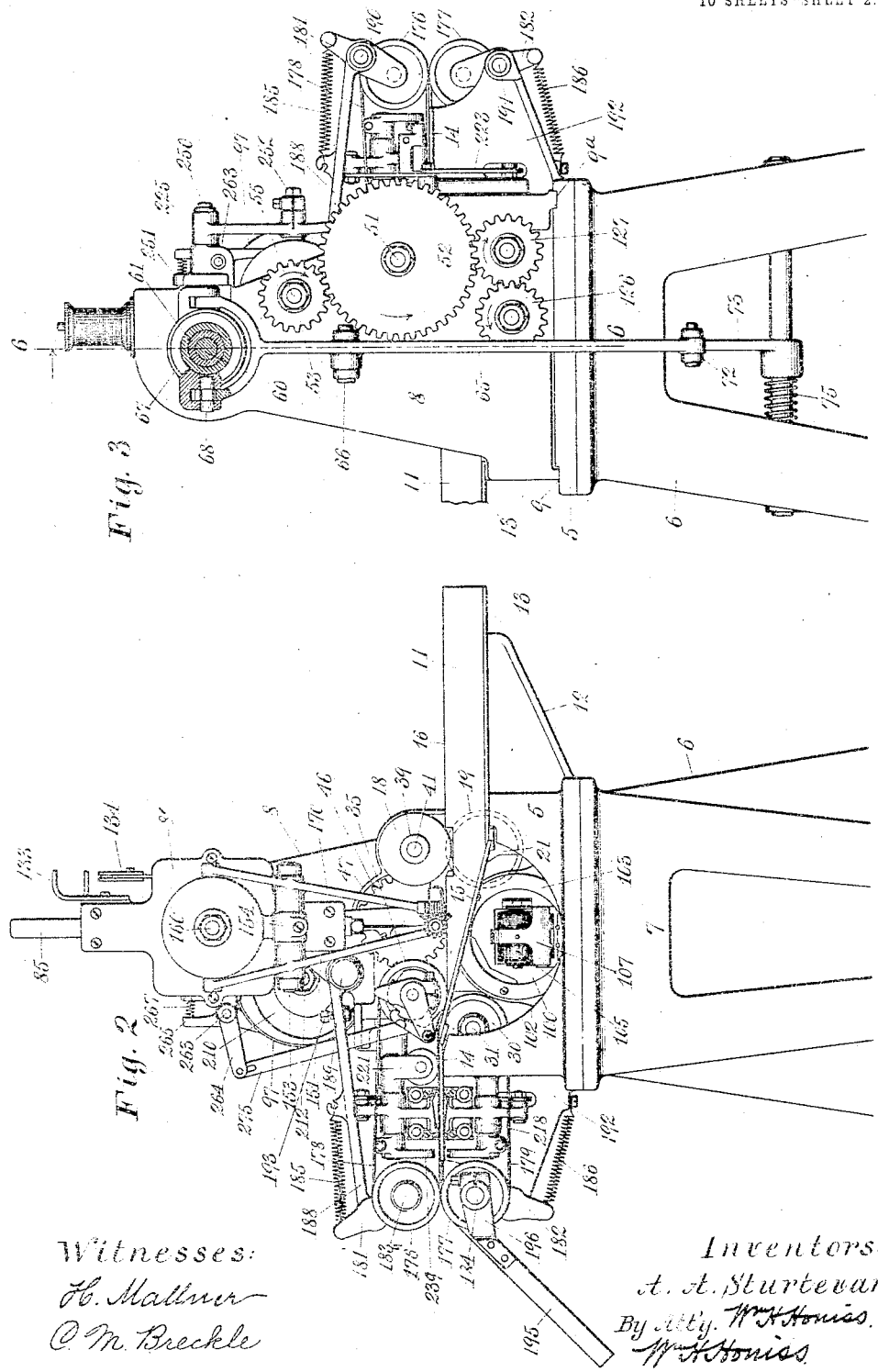

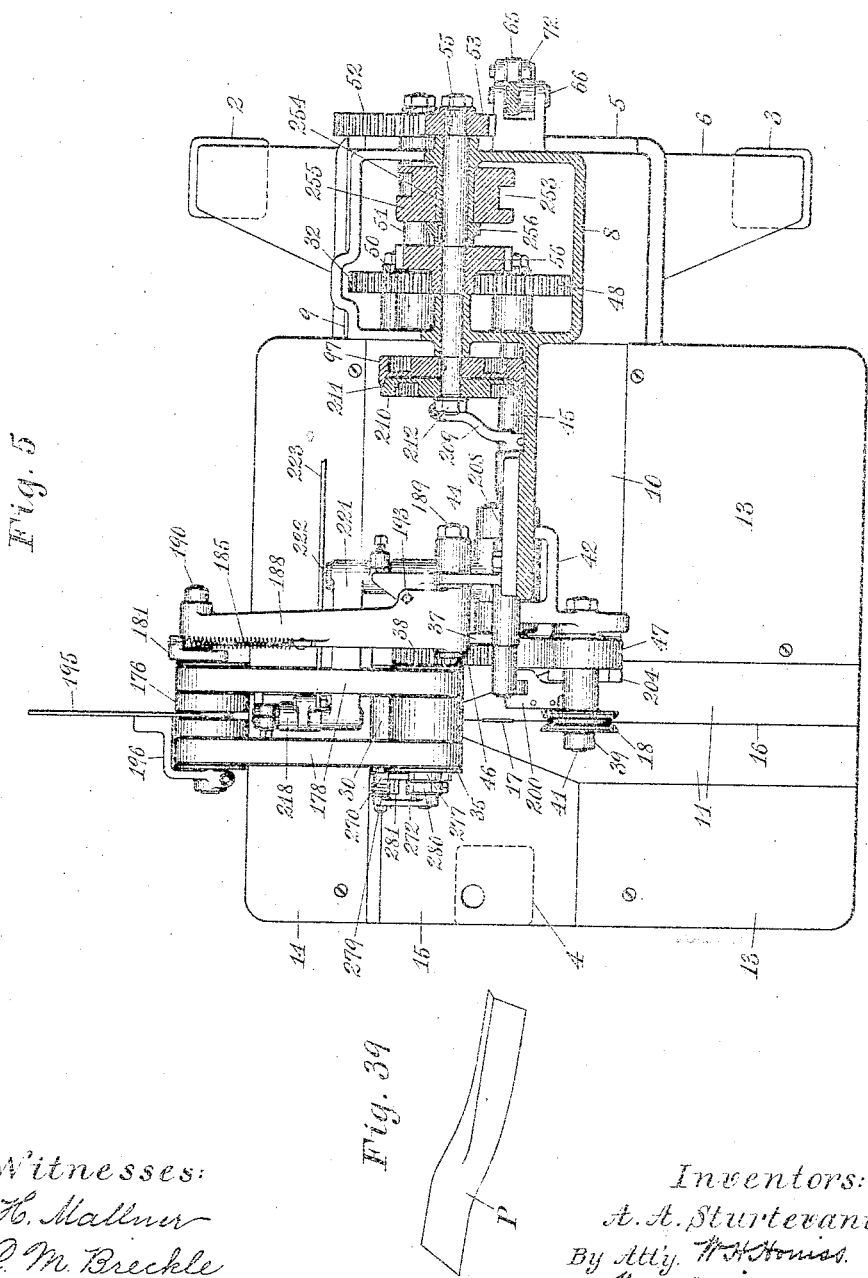

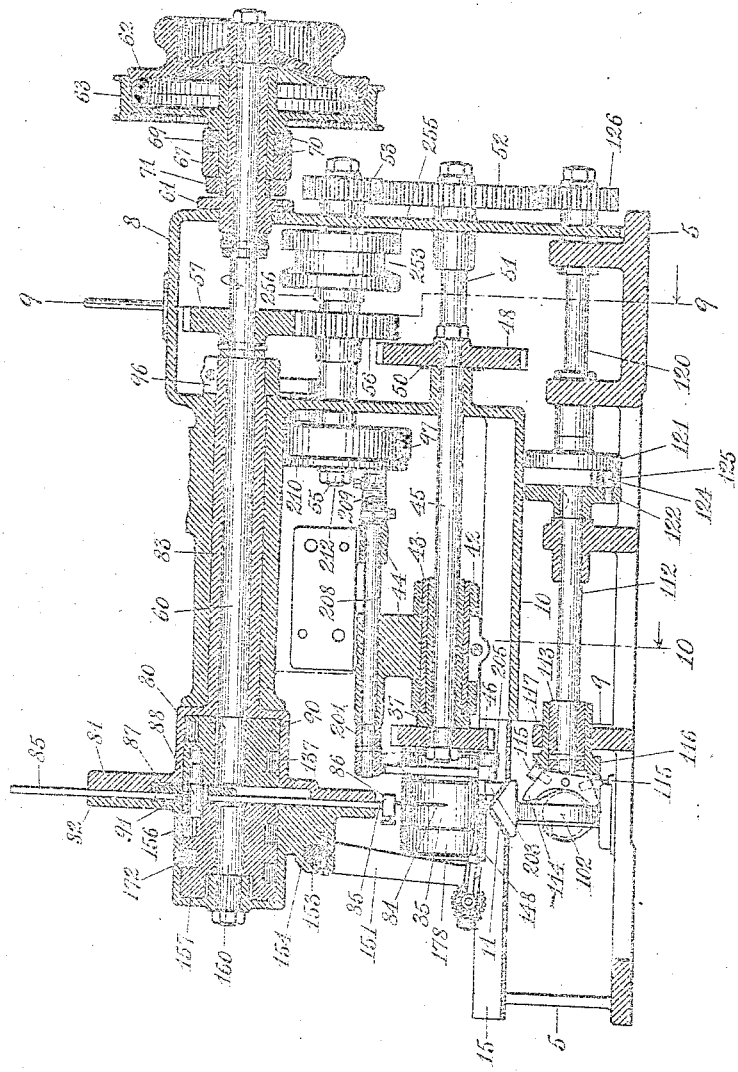

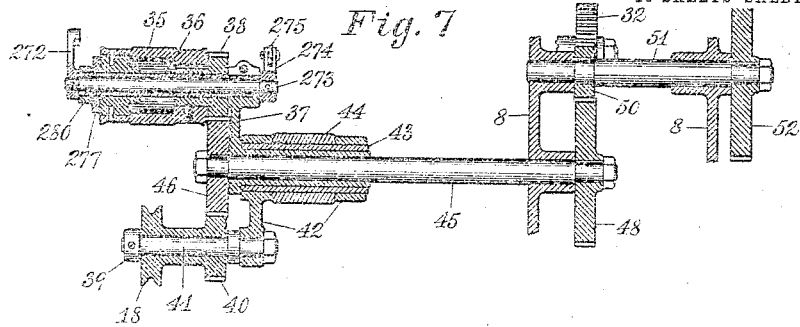

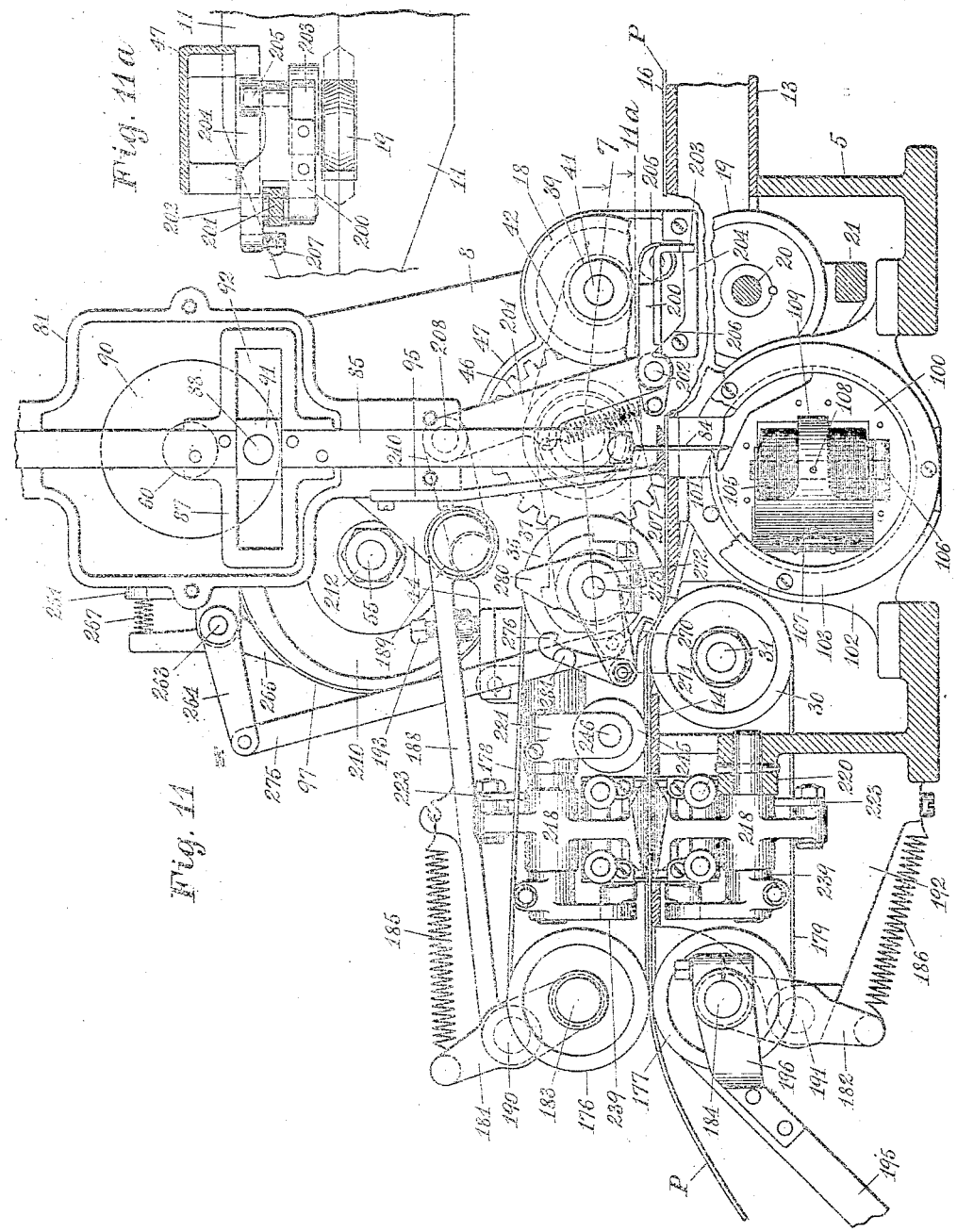

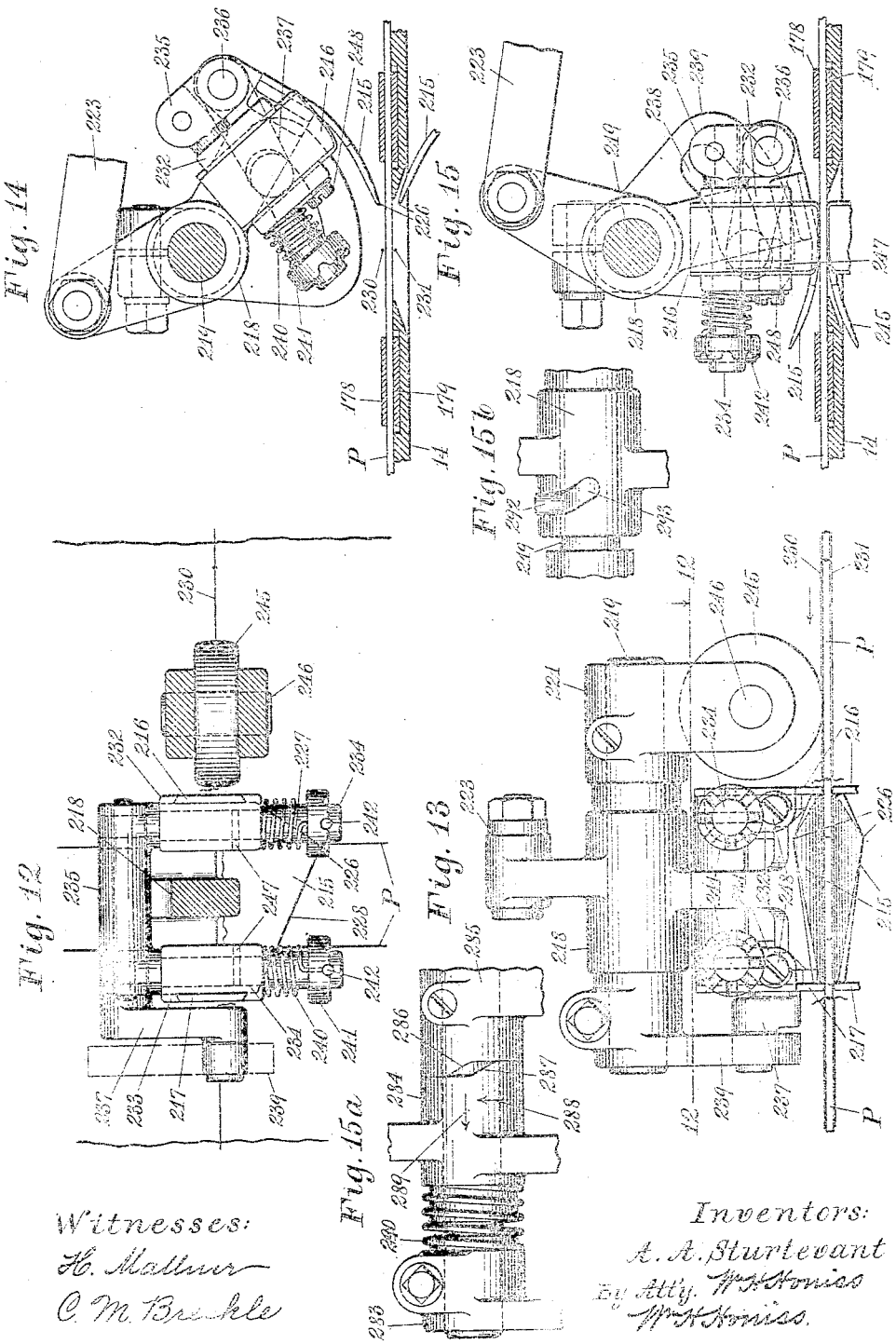

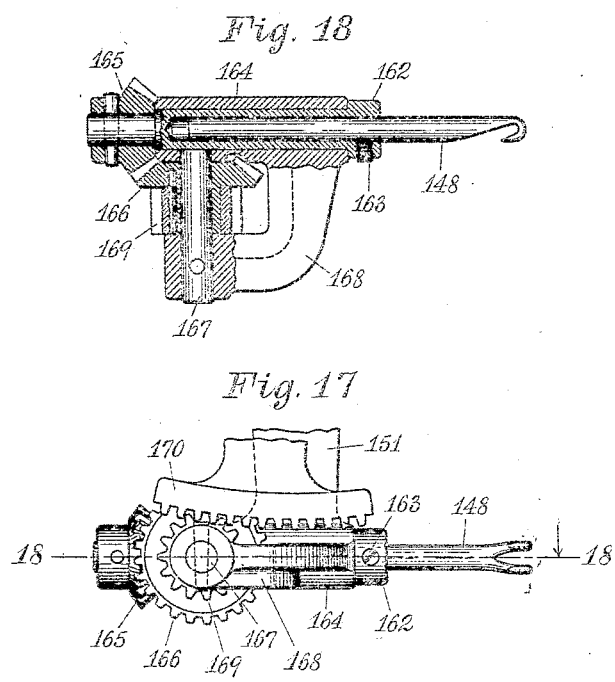
Fig. 18
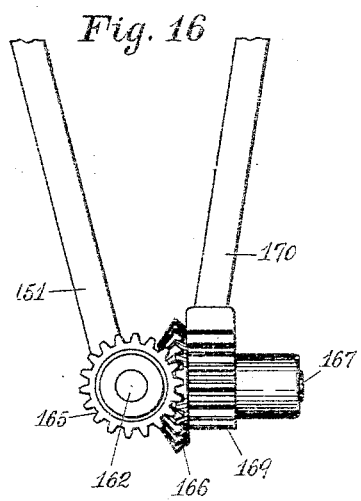
Fig. 16
Fig. 17
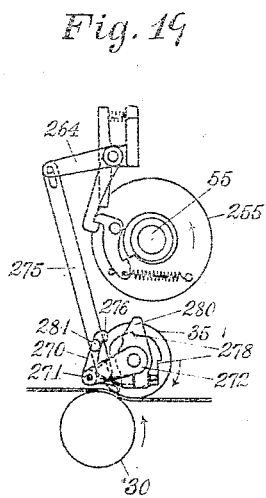
Fig. 19
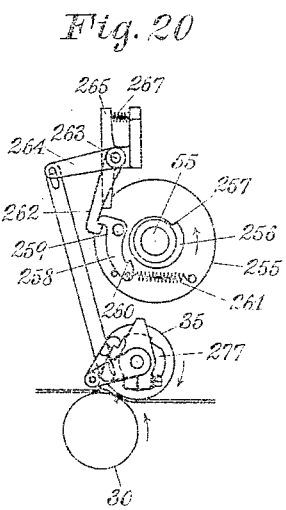
Fig. 20
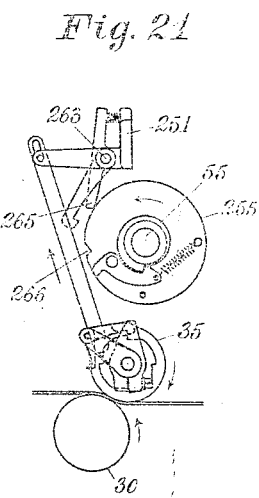
Fig. 21

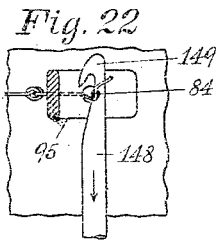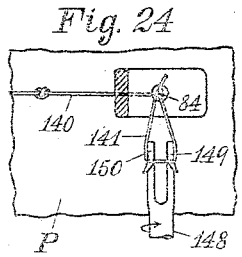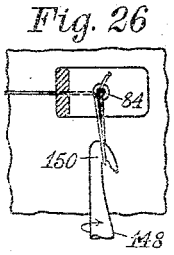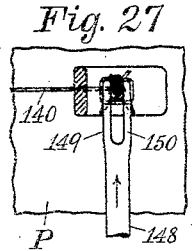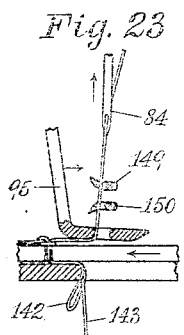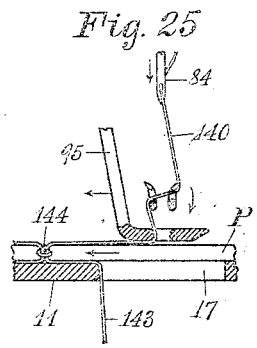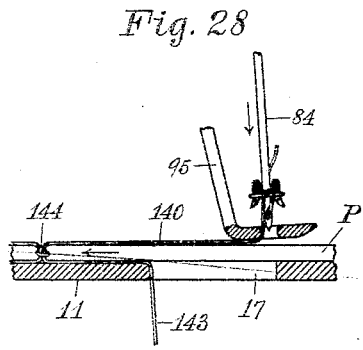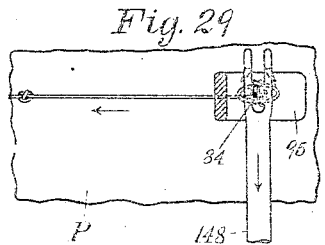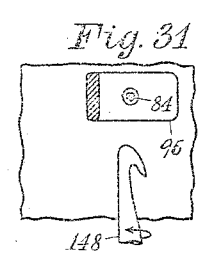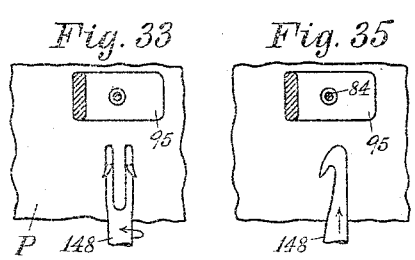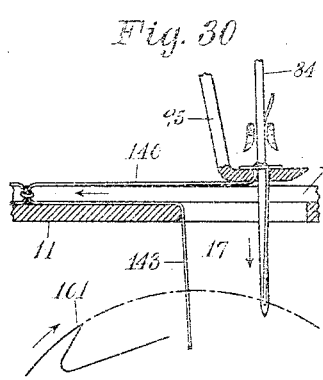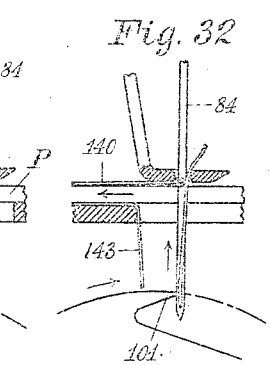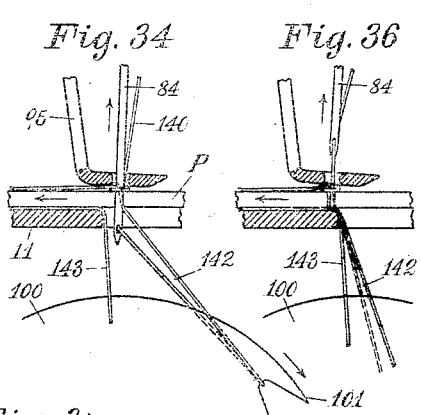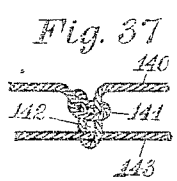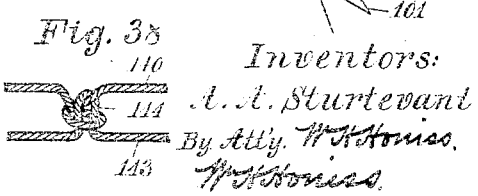

UNITED STATES PATENT OFFICE.

ALBERT A. STURTEVANT, OF HARTLAND, VERMONT, AND WILLIAM H. HONISS, OF HARTFORD, CONNECTICUT.

PAMPHLET-STITCHING MACHINE.

1,114,063.

Specification of Letters Patent.

Patented Oct. 20, 1914.

Application filed May 29, 1902. Serial No. 109,628.

*To all whom it may concern:*

Be it known that we, ALBERT A. STURTEVANT and WILLIAM H. HONISS, citizens of the United States, and residents, respectively, of Hartland, in the county of Windsor and State of Vermont, and of Hartford, in the county of Hartford and State of Connecticut, have invented certain new and useful Improvements in Pamphlet-Stitching Machines, of which the following is a specification.

This invention is a machine for sewing a seam securely knotted at each stitch and for automatically gaging, feeding and guiding the work in proper relation to the sewing and knotting mechanism.

It also comprises means for automatically cutting the threads of the seam at any desired intervals, so as to separate distinct pieces of work, or to produce successive interrupted series of stitches, according to the character of work to be done.

This invention as herein shown and described is embodied in an organized machine, adapted for feeding books or pamphlets through the machine, sewing their leaves together with a continuous seam, tied in a weaver's knot at each stitch, and then cutting the seam at each interval between the pamphlets, so as to separate them again from each other. This embodiment of the invention furthermore comprises various subordinate or auxiliary devices, and includes details of construction and arrangement which will be hereinafter more fully described and pointed out in the claims.

Figure 1 of the drawings is a front elevation of the machine with portions of the legs broken away. Fig. 2 is an end view projected from the left hand end of Fig. 1. Fig. 3 is an end view projected from the right hand end of Fig. 1, the clutch mechanism being shown partly in section taken along the line 3 of Fig. 1. Fig. 4 is a rear elevation of the machine. Fig. 5 is a plan view in section taken on the line 5—5 of Fig. 4. Fig. 6 is a front view in section taken on line 6—6 of Fig. 3. Fig. 7 is a plan view in section taken through the line 7—7 of Fig. 11. Fig. 8 is a plan view of the shuttle and lower feed roll mechanism, the cover plates and head of the machine being removed. Fig. 9 is an end view in section taken on the line 9 of Figs. 6 and 8. Fig. 10 is an end view in section taken on the line 10 of Fig. 6. Fig. 11 is an end view in enlarged scale, of the left hand end of the machine. Fig. 11ª is a plan view of the gage arm and its lifting cam. Figs. 12 to 15 inclusive are views in still further enlarged scale of the mechanism for cutting off the connecting threads between the pamphlets. Fig. 12 is a plan view in section taken on the line 12—12 of Fig. 13. Fig. 13 is an end view. Figs. 14 and 15 are front views showing the thread cutting device at opposite ends of its stroke. Figs. 15ª and 15ᵇ are fragmentary views showing modified arrangements of the cutter mechanism. Fig. 16 is an end view and Fig. 17 a front view, also in enlarged scale, of the knotter hook and its operating mechanism. Fig. 18 is a plan view of the same parts, in section taken on the line 18—18 of Fig. 17. Figs. 19, 20 and 21 are end views in reduced scale, showing successive positions of the clutch and signal devices, for controlling the operation of the thread cutting mechanism. Fig. 19 shows the devices in their inoperative position, with the feeler resting upon a passing pamphlet. Fig. 20 shows the engaging movement of the signal mechanism by the dropping down of the feeler between two succeeding pamphlets. Fig. 21 shows the release of the clutch from its stationary position, and its engagement with its driving devices, consequent upon the operation shown in Fig. 20. Figs. 22 to 26 inclusive show the successive positions of the stitch and knot forming devices at different times throughout their operation of forming a stitch and tying the knot. Fig. 22 is a plan view and Fig. 23 an end view showing the position of the needle and the knotter hook at the commencement of a new stitch, the knot of the previous stitch being also shown in process of completion. Fig. 24 is a plan view, and Fig. 25 an end view showing further progress of the new stitch and the completion of the knot of the previous stitch. Fig. 26 is a plan view showing the knotter hook turned part way from the position shown in Fig. 24, in forming the preliminary loop. Fig. 27 is a plan view and Fig. 28 an end view showing the preliminary loop completed by the further turning of the knotter hook from the positions of Figs. 24 and 26, and showing the needle carrying the upper thread down through the preliminary loop. Fig. 29 is a plan view and Fig.

30 an end view showing the position of the knotter hook after "shedding" the preliminary loop upon and around the needle. Figs. 31, 33 and 35 show the positions of the knotter hook when turned back from the position of Fig. 27 to that of Fig. 22, while Figs. 32, 34 and 36 are end views showing the relative positions, at the corresponding times, of the needle and the shuttle. Fig. 37 shows the weaver's knot at a period in its development immediately succeeding that shown in Fig. 23, the loop in the upper or needle thread being not yet fully contracted upon the lower or shuttle thread, which was passed through that loop by carrying the loop around the shuttle. Fig. 38 shows the completed knot, the needle thread being taken up so as to draw the lower or shuttle thread in a loop backwardly through the preliminary loop of the needle thread, in which position the knot is tightened and assumes the form characteristic of the weaver's knot. Fig. 39 is a perspective view, showing the conversion of the pamphlet from a V-shape into a flat form.

It is desirable to preface the detailed description of the mechanism by a brief description of the principal functions of the machine. The circulars or pamphlets, the leaves of which are to be sewn together are fed through the machine at a uniform rate of speed by means of rotating feed rolls, while the stitches are made along the central longitudinal fold line of the pamphlets, which are preferably folded to the desired line before being passed through the machine. The pamphlets are first placed upon a V-shaped table or saddle, the apex of which locates and guides the fold line of the pamphlet in line with the needle. The pamphlets are carried along the V-shaped saddle by means of a correspondingly shaped pair of feed rolls which are relatively narrow and engage with the pamphlet on both sides of the fold line and closely adjacent thereto. As each pamphlet is fed forward by the rolls the leaves are perforated and sewn together by a needle mounted in a swinging head, which moves the needle forward in register with the work while engaging therein. A double thread is employed for sewing the leaves together, the upper thread being carried by the needle, while the lower thread is carried in the shuttle, which is adapted to receive a good size spool or cop of thread. At the end of each stitch, where the threads pass through the pamphlet and interlock, a weaver's knot is securely tied, so that the thread is firmly secured at each stitch.

The sewing and knotting operation is continuous, so that the succeeding pamphlets are united at their ends by the two threads. In order to secure a uniform disposal of the stitches upon the succeeding pamphlets, a registering gage is employed for regulating the feeding of the pamphlets into the machine, the ends of the terminal stitches of each pamphlet being preferably located at substantially uniform distances from the respective ends. After the pamphlets leave the needle each of the two connecting threads are cut off preferably in two places close to the terminal knots, so as to leave only short ends of the thread projecting from those terminal knots. While the pamphlets are being sewn, they remain partly folded, in conformity with the V-shaped saddle, which extends somewhat beyond the point where the knotting is completed, merging thence into a flat horizontal table, which, in conjunction with a pair of cylindrical feeding rolls, flattens out the pamphlets to facilitate access of the cutting blades to the connecting threads of the pamphlets, especially to the under thread. The time of operation of the cutting-off device is controlled by means of a feeler which rests upon the pamphlets and by dropping into intervals between succeeding pamphlets gives the signal for the operation of the thread cutting mechanism. The separated pamphlets are then delivered from the machine into any suitable box or tray or conveyer.

The mechanism is mounted upon the bed 5 supported by the legs 6 and 7, the former of which separates toward the base in the approximate outline of the letter A, and is provided with two widely separated feet 2 and 3, while the leg 7 converges toward its base like the leter V, and terminates in a single foot 4, the two legs thus forming a supporting base having three feet, which always rest firmly upon the floor, and thus support the machine against vibration (Fig. 5). Furthermore this V-shaped form of the leg 7 makes access to this portion of the machine easier by not interfering with the knees or feet of the operator, who sits or stands at this end of the machine.

For convenience of manufacture and assembling, the machine is structurally divided into two sections, an upper and a lower, the upper section comprising the mechanism which works above the pamphlets, while the lower section comprises the mechanism which works on the lower side of the pamphlets, the latter mechanism being mounted in the bed 5, while the mechanism of the upper section is mounted in the head 8. For convenience in constructing and assembling that head is made detachable from the bed in its entirety along the joint line designated by the numeral 9 in Figs. 1, 3, 4 and 6, the head being preferably located and alined with the bed by means of a tongue and groove construction 9ª in Fig. 3.

The head 8 is of box like construction, open at the back and on the under side, the plate 10 serving as a cover for the mechanism for the bed. That plate extends to and makes a close joint with the plates 11, 13, 14 and 15, which form a table at the left end of the machine for supporting the pamphlets in their progress through the machine. That table is of peculiar form, which at its front end is adapted to receive and support the pamphlets in V-shaped form, which from the point where the stitches are made and completely knotted, merges into a horizontal surface, gradually converting the advancing pamphlets from their V-shape into a flattened form.

The general contour of the table surface is shown in Figs. 1 and 2, and is formed by the horizontal plate 13, the horizontal plate 14 parallel with but considerably above the plates 13, and the inclined plates 15, joining the plates 13 and 14 at an easy angle. The angular saddle upon which the pamphlets are first placed to locate and guide them accurately in alinement with the needle so that the line of stitches will be coincident with the longitudinal fold line of the pamphlet, consists of the two plates 11, which rest upon the plate 13, the upper edges of these plates forming the apex 16 of the saddle, which merges into the inclined plates 15 at a level considerably below the surface of the plate 14. The saddle plates 11 are provided with an aperture through which the rolls 18 and 19 meet, and with a needle slot 17, through which the needle communicates with the shuttle, the slot being long enough to allow of the swinging movement of the needle, while following the movement of the pamphlet. The inclined plate 15 at the end of the machine is fitted at its edges to the plates 13 and 14, as shown in Fig. 2, so that it may be removed by sliding it endwise, thereby affording ready access to the shuttle mechanism beneath it. The contour of the top plate which covers the bed is substantially coincident with that of the plates 13, 14 and 15.

As the pamphlet passes along the saddle its edges are gradually raised by the inclined plates 15, the plane of which intersects the line of the apex 16 of the saddle substantially at the roll 30, the top surface of the plates 15 and the line 16 being both substantially tangent to the circle of that roll, so that the longitudinal fold line of the pamphlet disappears at the roll 30. It is found that when one end of a pamphlet is retained in V-shaped form, and the attempt is made to flatten the other end, the flattened end tends to turn upwardly at a considerable angle with the line of the V-shaped corner, as shown in Fig. 39. To accommodate this tendency of the pamphlet the inclined plates 15 are continued for some distance above the plane of the apex 16 of the saddle, after which the plates are preferably curved downwardly in substantial conformity with the circle of the lower feed roll 30, until they reach a horizontal position, from whence they proceed in a horizontal plane in a tangential relation to the top surface of that roll. Thus the table approximately conforms to a contour which the pamphlet will assume without distortion or wrinkling while opening into the flat form, that contour of the pamphlet being shown in Fig. 39.

The pamphlets are advanced through the machine by means of three pairs of feed rolls, best shown in Figs. 2 and 11. The first pair of rolls 18 and 19 are narrow, and are V-shaped as shown in Fig. 1 in conformity with the angle of the saddle plates 11. The upper roll 18 is of a concave V-shape, while the lower roll 19 is correspondingly convex, the V-shaped line of contact between the two rolls being coincident with the V-shaped surface of the plates 11, as viewed in Fig. 1. The center of the V-shaped contour of the roll 18 is relieved so that the effective bearing upon the paper or the pamphlets is along two narrow zones, lying close to and on opposite sides of the apex of the saddle, these zones being made narrow so as to establish a definite and uniform driving ratio between the two rolls, and to avoid variations and uncertainty liable to attend the use of wide V-shaped surfaces, due to the differences in their effective driving diameters.

The lower feed roll 19 is supported in bearings in the bed 5, and the upper portion of its convex V-shaped periphery projects through openings in the saddle plates 11, in coincidence with the upper surfaces of those plates. The roll is preferably made adjustable by being mounted upon a stud 20, which is supported at its ends in the eccentric bracket 21, having a sleeve bearing supported in the cross bar 117 of the bed. The adjacent end of the driving shaft 23 is journaled in and concentrically with the said sleeve, and that shaft has fixed upon its end the gear 24, which meshes with the gear 25, fixed to or integral with the lower roll 19, turning upon the stud 20. On account of the fact that the roll 19 is situated in the apex of the saddle it would be difficult to mount it directly upon its driving shaft 23, since the latter must be below the plane of the plates 13 and 15. Furthermore this employment of an eccentric bushing or bracket 21 enables the roll to be adjusted accurately to its best working position with relation to the saddle plates 11, and to facilitate this adjustment the bracket 21 is provided with an adjusting screw 26, by means of which the roll may readily be swung to the desired position, and supported therein against the pressure of the upper roll. The shaft 23 extends along the bed beneath the cover plate 10, its opposite end being journaled in the bed and provided with a gear 27 (Fig. 8) which meshes with the gear 48 of the train of gearing which drives the three sets of feed rolls at uniform and properly correlated speed (Fig. 9).

The lower roll 30 of the second pair of feed rolls is mounted upon the shaft 31, the ends of which are journaled in the bed as shown in Fig. 8, and has fixed upon its right hand end a gear 32, which meshes with the gear 50 of the feed roll driving train (Fig. 9). As previously described, this roll 30 is so located that its upper peripheral surface substantially coincides with the upper surfaces of the plates 14 and 15, by preference projecting slightly above the latter plate, as shown in Fig. 2.

The upper feed rolls 18 and 35, which coöperate with the rolls 19 and 30, respectively, are also positively driven from the train of driving gearing shown in Fig. 9; and these rolls are mounted so that they are movable to and from their respective coöperating rolls 19 and 30 to allow for feeding different thicknesses of work between them. The roll 18 and its attached or integral driving gear 40 are mounted to rotate upon the stud 41, fixed in the arm 42, which is mounted to oscillate upon the ends of the bushing 43, supported and clamped at its center in the bracket 44. The roll 35 is mounted to rotate upon the stud 36, the end of which is secured in the arm 37, which is mounted to oscillate on the inside of the bushing 43; and this portion of the arm 37 serves as a bearing for the rotating driving shaft 45, the left hand end of which is provided with the gear 46, which meshes with and drives the gears 38 and 40 of the upper rolls 18 and 35 respectively. Inasmuch as the driving gear 35 is thus located concentrically with the axis of oscillation of the arms 37 and 42, which carry those upper rolls, it is evident that the latter will remain in positive driving engagement with the gear 35 in spite of the differing thicknesses of the pamphlets. The gears 40 and 46 are preferably protected by means of a guard 47, carried by the arm 37. The roll 18 and its gear are fitted so as to have a limited amount of endwise movement upon the stud 41, so as to allow the roll to adjust itself while running to the angular saddle plates 11, the collar 39 being used to keep the roll from coming off the stud. The driving shaft 45 is journaled at its right hand end in the head 8, and that end of the shaft is provided with a gear 48 gearing with the train shown in Fig. 9. That train of gearing is driven by means of the pinion 50 on the shaft 51, which is journaled at its ends in bearings in the head 8. The right hand end of this shaft projects beyond the box-like casing of the head, and has fixed upon it the driving gear 52, which meshes with a gear 53 on the cam shaft 55. That cam shaft is journaled in the box-like vertical portion of the head 8, and has fixed upon it within the box, the gear 56 which meshes with the driving gear 57 on the main shaft 60. The ratio of the train of gearing thus far described is such that the main shaft and cam shaft each make one rotation for each stitch to be made in the pamphlets, while the remainder of the driving train by which the feed rolls 18 and 19 and 30 and 35 are driven is so proportioned as to advance the pamphlets to an extent equaling the length of a stitch, during each rotation of the shafts 55 and 60.

The delivery rolls 176 and 177 which constitute the third pair of driving rolls for feeding the pamphlets through the machine are herein shown to be driven by the endless belts 178 and 179 from the second pair of driving rolls 30 and 35 respectively (Figs. 5 and 11). These rolls are preferably reduced in diameter as best shown in Fig. 4, at the portions which receive the belt, so that the outer surfaces of the belt are practically coincident with the circumference of the rolls, so as to maintain the linear speed of the pamphlets at approximately the same rate throughout the machine.

For some classes of work it may be desirable to drive the rolls 176 and 177 positively, which may be done by means of gearing in any well-known way, by a train of gearing from the gears 32 and 38, respectively. When driven as herein shown by belts or tapes provision should be made for the stretching incident to their continued use. To this end the rolls are herein shown to be mounted upon the swinging crank arms 181 and 182, in which are mounted the studs 183 and 184, upon which the rolls rotate. The outer ends of these crank arms are provided with springs 185 and 186, connected to any convenient support, the tension of the springs serving to keep the rolls 176 and 177 tightly drawn to the left, as viewed in Fig. 11, so as to keep the belts in proper driving tension. In order to enable these rolls to accommodate themselves to the varying thicknesses of the pamphlets, one of them, preferably the upper roll 176, with its crank arm 181, is mounted upon a swinging arm 188, which is pivotally mounted upon the stud 189, to the frame of the machine, the opposite end of the arm being provided with the pivot stud 190, for the crank arm 181. An adjusting screw 193 is preferably used to support the arm 188. The corresponding pivot stud for the crank arm 182 is secured in the bracket 192, or in any other convenient portion of the frame.

As a means for supporting and guiding the pamphlet while being delivered from the rolls 176 and 177 we preferably employ a delivery rod or plate 195, secured to an arm 196 adjustably clamped upon the stud 184, around which the delivery plate may be adjusted in any desired angular relation best suited for the delivery of the pamphlets into a box or tray, or into a folding apparatus. The delivery plate is herein shown to be a thin plate (Fig. 5) located in coincidence with the central longitudinal fold line of the pamphlets, which fall upon the upper edge of this plate, as they deliver from the rolls 176 and 177, the plate thereby assisting in the folding together of the pamphlet. Any other form of delivery plate, however, may be employed, suited to the character of the pamphlets.

The main shaft 60 is journaled in the sleeve 83 of the swinging head 80, and concentrically with the axis of oscillation thereof, as will be hereinafter more fully described. The right hand end of the shaft 60 is preferably journaled in a bushing 61, which is firmly secured to the head 8, and extends outwardly therefrom to carry the clutch devices which are employed for stopping and starting the machine. The outer end of the shaft 60 has fixed upon it a clutch or pulley, by means of which motion is imparted to the machine. As herein shown the machine is driven by a friction clutch, the driven member 62 of which is fixed upon the right hand end of the shaft. This clutch member is also adapted to serve as a handwheel for turning the machine by hand. The clutch pulley 63 is fitted to rotate upon the outside of the projecting sleeve or bushing 61, and is adapted to receive a belt from any convenient power shaft. This clutch pulley is adapted to coact with the driven clutch member 62 by means of tapering gripping surfaces, in the customary way, the pulley being moved longitudinally to engage and disengage it from the driven member 62, by means of a lever 65, which is pivotally mounted at 66, upon the head 8. The upper end of this clutch lever is forked as shown in Fig. 3, and engages with the opposite sides of the non-rotating clutch collar 67, by means of the studs 68, which are mounted loosely at the opposite sides of the collar, the sides of the studs being flattened to receive the upper ends of the fork of the clutch lever 65, so that the fork slides on the studs and the studs turn in their seats in the collar 67 in conformity with the swinging movement of the head. The collar 67 is mounted freely upon the outside of the sleeve or hub of the clutch pulley 63. The end thrust of the clutch collar for moving the clutch pulley 13 into engagement with the driven clutch member 62 is taken by a circle of balls 69, and the hardened collars 70, one of which turns with the clutch pulley 63, while the other is stationary with the clutch collar 67. The end of the clutch collar projects over the bearing as shown in Fig. 6, so as to exclude dirt and grit therefrom. The end thrust of the collar 37 for loosening the clutch pulley 63 to stop the machine is taken by the clamping collar nut 71, screwed upon the end of the sleeve of the clutch pulley. This clutch construction is simple, cheaply made and very quick and sensitive in operation. It grips securely when in driving contact, and the pulley 63 when free turns loosely upon the outside of the bushing 61, entirely free from the main shaft 60, so that there is no possible danger of starting the machine in operation by the gripping of the clutch pulley bearing upon the shaft journal, from failure to oil the bearing. The lower end of the lever 65 is connected by means of the link 72, the cranked arm 73, and the connecting rod 74 to any convenient form of treadle (not shown). A spring 75 serves to yieldingly hold the clutch pulley 63 in its disconnected or non-driving position, a slight pressure of the foot serving to overcome the tension of the spring, to engage the clutch and start the machine in operation, the machine being immediately stopped by raising the foot and allowing the spring to release the clutch.

The needle mechanism is carried on a swinging head 80, which for convenience in construction and assembling is made in two sections, 81 and 82. The section 81 is provided with a sleeve 83 which is journaled in the head 8, the bearing being sufficiently long to form a suitable support for the entire head. This sleeve 83 is bored out to provide a concentric bearing for the rotating main shaft 60 already described, so that the head oscillates in a concentric relation to the rotating shaft.

The needle bar 85 is fitted to reciprocate vertically in the head, as best shown in Figs. 6 and 11, the lower end of the needle bearing being provided with suitable clamping devices 86 for the needle 84. The two sections 81 and 82 are preferably joined together in the plane of the needle bar, and secured together by screws, so that by removing the section 82, the needle bar may readily be removed therefrom.

As a means for reciprocating the needle bar, it is provided with a cross head 87, best shown in Fig. 11, which is driven by means of a crank pin 88, fixed in the side of the take-up cam 90. The crank pin engages with the cross head by means of a roller or block 91, which as the crank pin rotates, rolls or slides across a transverse slot or cam path 92 of the cross head. That slot may either be straight, as shown in Fig. 11, or it may be curved in the form of a heart cam, as in the ordinary sewing machine, or any other form that may be suitable for imparting the desired movement to the needle which will depend somewhat upon the form of shuttle mechanism with which the needle is to coöperate. We prefer the straight slotted form of needle head herein shown, inasmuch as it enables us to employ the rectangular form block 92, thereby securing a better wearing connection between the crank pin and the needle bar.

The guide or presser foot 95 is secured in any convenient way, as shown in Fig. 11, to the lower end of the swinging head 80, being preferably made adjustable on the head to suit the different thicknesses of pamphlets to be sewn. This guide or presser foot serves to guide the thread and also serves to keep the pamphlet from rising while the upper thread is being drawn tight to complete the knot. In some cases it is desirable to mount this presser foot so as to have a resilient downward pressure upon the work, as in the ordinary sewing machine, not only to allow for the differing thicknesses of the work, but to compensate for the change in level due to the swinging movement of its lower end, particularly when the timing of the mechanism requires the knot to be drawn tight when this presser foot is not at the middle or lowest position of its swing, shown in Fig. 11.

In order to oscillate the head 80 so as to carry the needle along with the work at the same rate of travel when the needle is in the work, and to return the needle to its first position for penetrating the work at the right points for the succeeding stitches, the sleeve 83 is provided at its right hand end with a cam arm 96 (Figs. 4 and 6) which engages with the cam 97 on the cam shaft 55, that cam being so shaped as to impart the required swinging movement to the head, the cam path being laid out with particular accuracy for that portion of its operation which keeps the needle in register with the work while engaged therein, and as the latter is fed forward by the feed rolls. The cam shaft 55, as above noted, is geared to make one rotation for each rotation of the main shaft 60, the parts being so adjusted as to insure a proper time relation between the crank pin 88 and the cam 97, so that the head is swung backwardly to carry the needle with the pamphlet when the crank pin drives the needle into the work, and is swung forward again after the crank pin has carried the needle out of the work. The concentric relation of the swinging head and main shaft 60 enables this related movement to be established with as great accuracy and certainty as though the needle bar head were stationary, and the work were advanced by step by step movement as in the customary arrangement of the feed of a sewing machine.

Any desired form of shuttle mechanism may be employed for carrying the lower or shuttle thread, and passing it through the loop which is formed in the needle thread at the bottom of the stroke of the needle. The rotary shuttle herein employed consists of a flat substantially circular disk 100, which is cut away to form a beak 101 for entering the loop in the needle thread, when the needle starts back from its lowest position, as shown in Fig. 11. The shuttle disk is supported at its peripheral edge in a circumferential groove in the shuttle bracket 102, from which it may be readily removed by removing the ring 103. The shuttle thread is preferably wound in the form of a cylindrical cop 105 which rests in a rectangular opening, substantially in the center of the shuttle disk 100, being mounted upon a pin 106 which is hinged at one end to the shuttle disk 100, as shown in Fig. 11, so that it may readily be swung into and out of place to put on a new cop. As the beak of the shuttle enters the needle thread loop at the position shown in Figs. 11 and 32 it opens the loop which passes upon the opposite sides of the shuttle disk, as shown in Figs. 34 and 35, so that the loop is carried entirely around that shuttle disk, and therefore around the cop contained in the disk, which is the equivalent of passing the cop through the loop. In order to spread the loop and enable it to pass easily over the cop, guard plates 107 and 110 are employed upon opposite sides of the shuttle disk, the latter of which is preferably hinged thereto, as shown in Fig. 11, so that it may be readily opened to facilitate the insertion of a new cop, the end of the plate 110 forming a catch for latching it to the shuttle disk. This front guard plate is also preferably provided with a guide aperture 108 through which the shuttle thread is passed from the cop, and this aperture is preferably located substantially coincident with the axis of rotation of the shuttle, so as to draw more uniformly from the cop. A suitable tension device is also provided on the shuttle, for controlling the tension of the shuttle thread.

The shuttle disk 100 is rotated in its bearings in suitable time relation with the movements of the needle and the knotting devices, being driven by means of the shaft 112, journaled in the bed 5 (Fig. 6). The left hand end of the shaft 112 carries the shuttle driver which consists of a carrier 113 upon which is pivoted the carrier arm 114. This arm is provided near its opposite ends with cam pins or rollers 115, which engage with the cam 116 which is a fixed cam arranged concentrically with the shaft 112, and preferably forms the bearing for that shaft, as herein shown, being clamped in the cross rib 117 of the bed, so that it may be adjusted therein in proper time and relation to the carrier arm, to which it imparts an oscillatory movement as the carrier 113 is rotated by its shaft 112. By these oscillations of the carrier arm its ends are alternately carried into and out of engagement with notches or driving projections upon the shuttle disk 109, so that one end of the carrier arm is in driving engagement with that disk before the other end disengages therefrom, and vice versa, the alternate disengagement of the respective ends being for the purpose of enabling the loop of the needle thread to pass the carrier arm.

From the time that the beak 101 of the shuttle engages with the loop of the needle thread, it is desirable to pass the loop around the shuttle as quickly as possible. Hence this portion of the rotation of the shuttle is preferably accelerated. As a means for thus accelerating the rotation of the shuttle at this time, the shaft 112 is driven from another shaft 120, which is journaled on the bed 5 with its axis parallel but somewhat out of line with the axis of the shaft 112, as best shown in Fig. 8. The adjacent ends of these shafts are provided with the crank disks 121, 122, in which are fixed the crank pins 123 and 124, connected by the link 125. The shaft 120 is driven at a uniform rotative speed, being provided with a gear 126, which is driven through the medium of the intermediate gear 127 by the gear 52 (Figs. 3 and 8). The arrangement and connection of the shaft 120 with the shuttle shaft 112 serves to convert the regular rotations of the former shaft into an alternately accelerated and retarded movement of the latter shaft, the acceleration beginning when the beak of the shuttle engages with the needle thread at the positions shown in Figs. 11 and 32, and continuing until the needle thread loop is carried around far enough to be drawn up past the shuttle, the remaining or inoperative portion of the rotation of the shuttle being correspondingly retarded.

The head 8 has mounted upon it means as the pin 130 for carrying a spool 131 of thread, which passes from the spool through any approved tension device 132 to the take-up mechanism, which consists of a guide plate 133, having two projecting ears or fairleaders, through which the thread is passed, and of a take-up arm 134 which is pivotally mounted at 135 upon the head, and is provided with a cam roll or pin 136, which engages with a groove 137 in the take-up cam 90, which as previously described is keyed upon the main shaft 80, and serves as the crank disk for carrying the crank pin 88. The upper end of the arm is provided with suitable means, preferably a roll, for engaging with the thread, and drawing it out in the form of a loop, as shown in Fig. 1 from the guide plate 133, the cam groove 137 being so shaped as to operate the take-up arm 134 in suitable relation as to time and extent to the operations of the shuttle and knot tying mechanism. The thread passes from the guide plate 133 downwardly through a guide opening or leader, preferably in the needle clamp 86, whence it passes through the eye of the needle in the usual way.

The needle and shuttle mechanism as thus far described would, in operation, form the well-known lock-stitch, most commonly employed in two thread sewing machines, the upper thread simply interlocking with the lower thread where they meet in passing through the fabric or work. The term "lock-stitch" as heretofore employed is something of a misnomer, since in the well-known lock-stitch the threads interlock only in the sense that each passes half way around the other, and the threads of each stitch taken by itself can readily be pulled out of the knot. The security of the so-called lock-stitch, as compared with the more easily unraveled chain-stitch, is a matter of degree only, hence the word lock-stitch must be considered as being employed in its relative and not in its absolute sense, the relative security being largely due to the character of the woven fabric upon which it is most commonly employed. When both threads meet, and cross at the center of the thickness of the fabric, the stitches are held in reasonable security by the compressing action of the fabric upon the interlaced loops, but when through unevenness of tension, one of the threads merely lies along the surface of the fabric and passes through the loops of the other thread, without being bent or drawn into the fabric, the straight thread is about as easily pulled out as is the thread of the ordinary chain-stitch. Furthermore the ordinary lock-stitches are usually made quite close together, the relative security being largely the cumulative effect of the closely succeeding stitches. These characteristics of the ordinary lock-stitch are not available for the present purpose, which is to make the stitches long, as well as secure, both for economy of thread, and for rapidity of operation, also to avoid the weakening of the paper by a line of close perforations. Therefore, each of these stitches which are preferably made from one to two inches long, must be secure in itself, particularly in view of the fact that the end stitches of each pamphlet are cut off close to the knot. Furthermore, since the threads are cut off at one side of the knot at one end of the pamphlet, and at the other side of the knot at the other end of the pamphlet, it is necessary to make all four of the threads which lead from each knot equally secure, so that the knot cannot be untied or pulled loose by pulling on any one of these four threads. The known knot which most completely fulfils all these conditions is known as the "weaver's knot," and is also known by fishermen and sailors by the "sheet bend." On account of the well-known security of this knot it is here adopted for the present purpose, and is tied in the following manner, and by means of mechanism which will now be described, operating in conjunction with the needle and the shuttle. There are various existing methods of forming this knot, but the one herein shown is believed to be novel and best adapted to operate in conjunction with the ordinary lock-stitch forming mechanism. This method and the instrumentalities for forming it are illustrated in Figs. 22 to 38, inclusive.

Figs. 37 and 38 which are drawn on enlarged scale, show the knot itself at two principal stages of its formation. A preliminary loop 141 is first formed in the needle thread 140, and an adjacent portion of the same thread is doubled downwardly through the loop 141, by the needle, forming the loop 142, through which the shuttle thread 143 is then passed, the knot at this stage being in the condition shown in Fig. 37. Then the loop 142 is pulled backwardly through the loop 141, by drawing on the right hand end of the needle thread 140, bringing with it a portion of the shuttle thread 143 and forming the loop 144, the loop 142 disappearing in this process. The knot is then in the condition shown in Fig. 8, after which it is only necessary to tighten the knot by pulling the two right hand ends of the threads 140 and 143. The mechanism for tying this knot consists of the needle and the shuttle already described; and a coöperating device for making the preliminary loop or bight 141. The instrument which directly engages with the thread is the looper, or knotter hook 148, having the forked and barbed prongs 149 and 150, which engage with the needle thread as shown in Figs. 22 and 23 when the needle is at or near the uppermost end of its stroke. As the needle descends the prongs draw the thread forward to form the loop 141 as shown in Fig. 24, meanwhile turning it in the direction of the arrow shown in Fig. 25. The turning movement continues from the position shown in Fig. 26 to that of Figs. 27 and 28, at which the hook is turned three-fourths of a revolution from the position of Figs. 22 and 23, thus completing the loop 141 and then moving it forward beneath the descending point of the needle, which passes through the loop 141, as shown in Figs. 27 and 28, thus doubling the needle thread downwardly through the loop 141 and forming the loop 142. Having thus formed the preliminary loop 141 and delivered it to the needle the hook 148 then sheds that loop by moving forward to the position shown in Fig. 29, the loop being retained by the needle and thereby drawn off through the barbs of the hook, which then is drawn back to the position of Fig. 31, clear of the needle, and is rotated backwardly, as shown in Figs. 31, 33 and 35, to its original position preparatory to forming the preliminary loop for the next knot. Meanwhile the loop 142 is carried downwardly by the needle as shown in Figs. 30 and 32, to a point at which it is engaged by the beak 101 of the shuttle, and carried entirely around beneath that shuttle and around the cop of thread in the shuttle, as already described, so that the latter is passed through the loop 142, which, as it is drawn upwardly by the takeup, during the upward stroke of the needle as shown in Fig. 23, carries with it the lower or shuttle thread to the position shown in Fig. 37, the continued operation of the take-up operating to draw the shuttle thread upwardly through the loop 141 to the position shown in Fig. 38, after which the knot is tightened by a suitable relative tension upon the two threads 140 and 143. During the time that the knot is being thus formed the pamphlet P is fed forward at a regular rate, the needle traveling with the pamphlet during the time that it is engaged therewith, from the position shown in Fig. 28 to that of Fig. 36. According to the timing herein shown, the knotter hook 148 engages with the needle thread to form the preliminary loop for each knot before the completion of the preceding knot, as shown in Fig. 23; and the movement of the hook from this position to that of Figs. 24 and 25 is utilized to assist the takeup and tension devices in tightening each preceding knot as shown in the two latter figures.

The loop or bight forming instrumentality is supported for rotation on a swinging carrier or arm, and is rotated by means of an operating member mounted to swing upon an axis which is coincident with the axis of swing of the carrier, thus simplifying the construction, and enabling the movement of the respective parts to be properly and readily controlled and correlated.

From the preceding description it will be seen that the knotter hook is rotated and moved transversely to the path of the needle. In the preferred apparatus herein shown and described the hook is mounted in the lower end of the swinging carrier or knotter arm 151, which is pivotally supported upon the shaft or stud 153, fixed in the hub 154 of the cap section 82 of the swinging head 80, the upper end of the cam being provided with a pin or roller 155 working in the cam groove 156 of the cam 157. That cam is mounted to rotate upon the stud 160, which is fixed in the cap section 82 in axial alinement with the main shaft 60. On account of the interposition of the needle bar 85 and its cross head 87, the main shaft 60 cannot be extended through, so as to carry the cam 167; but that cam is driven by and with the shaft 60, by means of the crank pin 88 which is extended through the cross head and engages with the cam 157, as shown in Fig. 6, so as to rotate that cam coincidently with the rotation of the main shaft 60 and the takeup cam 90.

As best shown in Figs. 16, 17 and 18 the knotter hook 148 is carried by a socket or bushing 162, in which the hook may be adjusted and tightened in any desired position, by means of the screw 163. That socket is journaled in the hub 164 in the lower end of the arm 151, and has fixed upon it the bevel gear 165, which meshes with a bevel gear 166, rotatably mounted on the stud 167, supported at its ends in the hub 164 and in the bracket 168. The bevel gear 166 has fixed upon it a pinion gear 169, which engages with the teeth of a sector gear 170, which is mounted upon the front end of the stud 153, and therefore concentrically with the arm 151, the upper end of the sector being provided with a pin or roll 171, working in the groove 172 of the knotter cam 157. The swinging movement of the knotter arm imparted by the cam groove 156 imparts the transverse movements of the knotter hook 148 shown in Figs. 22, 24, 26, 27, 29, 31, 32 and 35, while the cam groove 172 operating through the sector gear 170 and the bevel gears 165 and 166 imparts to the hook the rotative movements shown in Figs. 23, 25, 28 and 30. The concentric mounting of the knotter arm 151 and its sector gear 170 enables the rotations and reciprocations of the hook to be varied to any desired extent, it being only necessary to arrange the contour of the two cam grooves 156 and 172, in suitable relation to effect any desired combination of movements. This mechanism is preferably, as herein shown, mounted upon and carried with the swinging head 80 so that the hook at all times accompanies the swinging movement of the needle. But this is not an essential feature of the invention, inasmuch as the knotter arm and its sector gear may be mounted to swing at any desired angle to the needle of any ordinary lock-stitch mechanism, to suit the location of the driving rolls or other environment of the needle; and may be employed with a non-swinging needle head, as if for example, the present head 80 were fixed in its central position here shown, or in any other position.

It is desirable to have the stitches located uniformly upon the successive pamphlets, both for the appearance of the finished work, and for convenience and certainty in the cutting of the threads to separate the pamphlets after they are sewn. In order to secure this uniformity, a gage is provided for feeding the front ends of the pamphlets into the bite of the first pair of driving rolls 18 and 19. The mechanism of this gage is best shown in Figs. 5, 6, 11 and 11ᵃ. The gage is pivotally mounted upon the swinging arm 201, by means of the stud 202, and is made to reciprocate longitudinally of the saddle, the end 203 of the gage serving to admit the front ends of the pamphlets in proper time to the first pair of feed rolls 18 and 19. At the rearward end of its stroke, after delivering the pamphlet to the roll, the end of the gage is lifted clear of the pamphlet to enable the latter to pass forward beneath it. To this end a cam 204 is secured to any convenient portion of the machine, preferably to the lower end of the gear guard 47, the gage being provided with a pin or roller 205, which rests upon that cam, the rearward end of which is provided with an incline 206, against which the roll is carried, at the rearward end of its stroke, so as to raise the front of the gage clear of the pamphlet. Upon the forward or return movement of the end of the gage it falls upon the pamphlet and is supported thereby. The saddle plate 11, immediately below the end of the gage is preferably recessed for the entire length of the stroke of the gage, so as to prevent thin pamphlets from being pushed beneath the gage. The gage is provided with a spring 207 which is attached from an extension of the gage, rearwardly of the pivot 202, to the gage arm 201, and serves to hold the front or working end of the gage, downwardly toward the work and upon the cam 204.

The gage arm 201 is mounted upon the shaft 208, journaled in the bracket 44, the right hand end of the shaft having fixed upon it the cam arm 209, which engages with the cam 210, mounted upon the cam shaft 55, by means of which a suitable reciprocating movement is imparted to the gage 200 at each rotation of the cam shaft, and therefore at each stitch made by the machine, this being desirable on account of the varying lengths of the pamphlets, requiring different numbers of stitches. Therefore the gage must be adapted to operate at any and every stitch. The driving contour of the cam 210 is so shaped as to hold the gage in its forward position shown in Figs. 11 and 11ᵃ, for as long a time as possible, so as to give the operator sufficient time to push the succeeding pamphlets against the gage, and hold them against as it recedes, thus letting the pamphlet forward into the bite of the feed rolls. In order to regulate and adjust the time of thus delivering the pamphlets to the rolls, due to the differing lengths of the pamphlets, the cam 210 is constructed so as to be readily adjustable circumferentially upon its shaft; and be clamped to place in any desired circumferential position thereon. To this end the cam is seated against the cam 97 by means of the bevel joint 211, which is of such an angle or taper that it will be gripped firmly to the cam 97 when the nut 212 is tightened, and be readily loosened again by the loosening of that nut. The peripheral surface of the cam 210 or of the cam 97 is preferably graduated, so as to enable the cam 211 to be immediately set at is desired positions, suitable for the different lengths of the respective pamphlets. This mechanism operates to cut off the connecting threads between the succeeding pamphlets to separate them after they are securely stitched, and as they pass from the second feed rolls 30 and 35 to the delivery rolls 176 and 177. This is preferably done by severing each of the two connecting threads at two points, quite close to the end knots of the adjacent pamphlets. The upper and the lower threads are cut by separate devices, mounted, respectively, above and below the pamphlet; but these two devices are identical as to mode of operation, and are substantially identical in construction, excepting that the lower thread cutting mechanism is mounted in a fixed relation to the bed, as shown in Fig. 11, while the upper thread cutting mechanism is mounted in a swinging arm, which enables that mechanism to adjust itself to different thicknesses of pamphlets. It will therefore be necessary to describe only one of these substantially duplicate sets of mechanisms.

The devices which operate directly upon the thread are the picker blade 215 and the shear blades 216 and 217 which coöperate with the opposite edges of the picker blade to form two pairs of shears, cutting the thread at two points. The picker blade 215 is fixed upon the picker arm 218, which is mounted to oscillate upon the stud 219, which in the case of the lower shear mechanism is fixed in the hub 220 of the bed; and in the upper shear mechanism is secured in the end of the arm 221, which in turn is mounted upon the stud 222, fixed in the bracket 44. The picker arms are oscillated by means of connecting rods 223, connected with the stud 224 in the lower end of the picker cam arm 225. That arm is pivotally mounted at 250 upon the bracket 251, and engages by means of a cam pin or collar 252 with the cam groove in the cam 255. That cam is mounted concentrically with the cam shaft 55, and is driven intermittently to operate the shear only at those stitches which unite the succeeding pamphlets, under the control of clutch and signal mechanism, which will be hereinafter described.

The points 226 of the picker blades extend beyond their coöperating shear blades 216 and 217, and are curved in substantial coincidence with an arc struck from the centers of the studs 219 (Figs. 14 and 15). The picker blades are inclined at 227 and 228, the latter incline being much shorter than the incline 227, on account of the circumstance that the point 226 of the blade is at one side of the center of the width of the picker blade, in order to allow for the travel of the pamphlet during the interval between the time that the point of the picker passes under the thread, and the time of cutting off the thread, it being desirable to "pick up" the thread at substantially the center of its length. Fig. 14 represents the picker and shear in their resting position, with the points 226 of the picker at one side of the threads 230 and 231, while Fig. 15 represents the cutting mechanism at the opposite end of its movement, after the picker has "picked up" the thread and the shear blades 216 and 217 have closed upon the thread and severed it. For cheapness of construction and ease of adjustment and renewal these shear blades are simple pieces of sheet steel, which are clamped in the blade holders 232 and 233, and are pivotally mounted upon the studs 234, the ends of which are fixed in the yoke 235, pivotally mounted at 236 upon the picker arm 218, that yoke being provided with an arm 237 working in the cam slot 238 of the cam 239, which is clamped upon the end of the stud 219, the cam slot serving to move the yoke and its connected shear blades downwardly to the position shown in Fig. 15, in moving thereto from the position shown in Fig. 14, in which position the shear is open. In order to hold the shear blades against their coöperating edges of the picker blade with suitable tension, the coiled springs 240 are mounted upon the studs, the inner ends of the springs bearing against the blade holders 232 and 233, while the outer ends of the springs are held by the collars 241, and as a convenient means for adjusting the tension of the springs these collars are provided with a series of notches which engage with a cross pin 242 in the stud 234. These springs are wound somewhat longer and compressed lengthwise, thereby serving to hold the blade holders longitudinally to place upon their respective studs. The blade holders 232, 233 are preferably split at 247, and are provided with the clamping screws 248, by means of which the blades may readily be clamped to place after adjustment, the edges of the blades being preferably dove-tailed in their seats in the holders as best shown in Fig. 12. Obviously, this form of blade holder may be very greatly simplified, and the number of parts much reduced by securing the blades directly upon the yoke 235, and utilizing the spring of the blades to secure proper working contact with the picker blade. But, for certainty, permanence and ease of action, and for convenience in removing, grinding, replacing and adjusting the shear blades we prefer thus to mount them in pivotally mounted holders, and to employ independent and adjustable spring tension devices for regulating the working tension of the blades. As the blades are reground they are pushed down in their holders, so that they may be reground and reset many times before being used up. These thread cutting mechanisms are adjusted in relation to the pamphlet, so that the points of the pickers will pass between the threads and the pamphlet, as shown in Fig. 14. The lower mechanism may be mounted in permanent relation to the surface of the top plate 14, since the pamphlet always rests upon the surface of that plate. But in order to maintain the upper cutting mechanism in constant engaging relation to the upper thread of varying thicknesses of pamphlets, we preferably employ a roll 245, mounted to rotate upon the pin 246, in the arm 221, the roller resting upon the pamphlets, so that the upper cutting mechanism is automatically maintained in proper operative relation to its thread, requiring no readjustment when changing from one thickness of pamphlet to another.

Inasmuch as the thread cutter operates to sever the threads only of those stitches which unite the ends of the succeeding pamphlets, and must rest inoperative as to the remaining stitches, means are provided for enabling the operation of the cutting mechanism to be automatically controlled by the pamphlets themselves.

The cutter cam 255 is mounted to rotate upon the outside of the bushing or hub 254 attached to or integral with the head 8, and concentric with the cam shaft 55, which rotates inside of that bushing. That shaft has keyed upon it the driver 256, which as best shown in Figs. 19-21 is provided with a single clutch tooth 257. The clutch dog 258 is pivotally mounted at 259 upon the side of the cam 255 and is provided with the shoulder or hook 260, for engaging with the clutch tooth 257, when the cam is to be rotated, at which times the dog is drawn into engagement with that tooth by means of the spring 261, the other end of which is fixed to the cam 255. During the time that the cam is to be held out of operation the clutch dog 258 is held in the position shown in Figs. 19 and 20, by means of the stop pawl 262, which is fixed on the shaft 263, journaled at or near its ends in the head 8 (Figs. 4, 11, 19-21.) That shaft has also fixed upon it the tripping arm 264, by means of which the stop pawl is withdrawn from its coöperating end of the dog 258, when it is desired to start the cam 255. The effect of the spring 261 upon the dog 258 operating against the stop pawl 262 as a fulcrum, while in the positions of Figs. 19 and 20, would be to rotate the cam backwardly, or in a direction opposite to that of the adjacent arrow, which would have the effect of bringing the tooth 257 and the hook 260 into striking contact at each rotation of the driver 256; and to prevent this action the detent 265 is mounted upon the shaft 263 to engage with a notch 266 of the cam, being pressed into engagement therewith by a spring 267, the detent serving thus to prevent the backward movement of the cam, holding the latter forward to the position shown in Figs. 19 and 20, with the hook 260 clear of the clutch pawl 257.

In some adaptations of this invention the tripping shaft is operated through intermediate connections from the gage mechanism; but in the present embodiment it is operated by means of a signal device, which is entirely separate from the gage as shown in Figs. 7, 11, and 19-21, and which consists of a feeler 270, pivotally mounted at 271 upon the arm 272, which is fixed upon the end of the shaft 273, journaled within the stud or bushing 86 upon which the feed roll 85 rotates (Fig. 7). The opposite end of that shaft has fixed upon it the arm 274, to which is pivotally attached the lower end of the connecting rod 275, the upper end of which is connected with a tripping arm 264. The feeler 270 is L-shaped, the upper member being provided with a hook or shoulder 276, located in the plane of a clutch plate 277, provided with notches pressed by means of a light spring 279 into contact with the upper surface of the pamphlets as they pass between the feed rolls 80 and 85. When thus supported by the pamphlets, the feeler is held in the position shown in Fig. 19, so that the notches or clutch teeth 278 rotate clear of the hook 276. But when an interval between the adjacent pamphlet reaches the rolls 80 and 85 the feeler drops into that interval as shown in Fig. 20, bringing the hook 276 into contact with the notches 278 of the rotating clutch plate which turns the signal device to the position shown in Fig. 21, thereby operating through the arm 274, rod 275, and arm 264 to withdraw the stop pawl 262 from the clutch dog 258, allowing the latter to be engaged by the clutch tooth 257, thereby carrying the cam a single rotation with the cam shaft 55, and thus operating the thread cutting mechanism. Upon the completion of that rotation of the cam 255, the clutch dog 258 is caught by the stop pawl 262 and released from the clutch tooth 257, thereby holding the cam stationary until the next succeeding operation of the signal device, at the next interval between the succeeding pamphlets.

As the feeler 270 is carried up from the position of Fig. 20 to that of Fig. 21 it is released from engagement with the clutch plate 277 by means of the cam 280, the inclined surface of which engages with the projection 281 of the feeler 270, thus allowing that feeler to return to the position of Fig. 19, where it rests upon the next pamphlet, until the next succeeding interval. The number of the notches 278 and the angular intervals between them are properly proportioned to the number and length of the stitches. In the case herein shown the circumference of the rolls 30 and 35 is equal to the length of four of the stitches, hence the use of the four notches in the clutch plate 277, as herein shown.

Where the rate of travel of the pamphlet is comparatively slow the traveling thread may be severed by a stationary shear blade, as previously described, without any appreciable difficulty or disarrangement, since the pinch of the blades upon the thread is so short, but where the work travels comparatively fast it may be desirable in some instances to have the shear blades advance with the thread at the moment of severance, so as to avoid a possible backward pull upon, or disarrangement of the threads, knots or pamphlets. In that case, the thread cutter may be arranged as shown in Fig. 15ª, in which the blade cam 283 is set to allow of a slight longitudinal movement of the picker arm 284 and its shear blades. The coengaging ends of that picker arm and of the supporting arm 285 for the pivot shaft 219 are provided with the inclined coengaging shoulders 286 and 287, respectively, which as the picker arm is oscillated in the direction of the arrow 288, serve to move the picker arm longitudinally in the direction of the arrow 289, just when the shear blades are engaging with and severing the thread, the angle of the inclines being adapted to move the picker arm and its shear blades at the rate of travel of the pamphlet. The opposite end of the picker arm hub and the adjacent end of the blade cam 283 may be correspondingly shaped, or as shown in Fig. 15ª a space may be left between them to allow for the longitudinal movement of the picker arm and a spring 290 to be employed to hold the picker arm and the supporting arm 285 in engagement. Or, as shown in Fig. 15ᵇ, a pin 292 fixed in the picker arm stud 219, and working in an inclined slot 293, in the picker arm 218, may be employed for effecting the desired longitudinal movement of the picker arm and its shear blades.

The operation of the machine as a whole is as follows: Having the pamphlets to be sewn piled conveniently at hand, the operator, either seated or standing at the machine, places one foot upon the treadle, and, pressing the clutch into driving contact, places one of the pamphlets upon the saddle 11, which alines it with the machine, bringing the longitudinal fold line, which is to receive the row of stitches, into alinement with the needle. The operator pushes the head of the pamphlet against the gage 203 as the latter goes forward toward the rolls, until the pamphlet is seized by the first pair of driving rolls 19 and 20, after which the operator pays no further attention to that pamphlet, but gets the next one in readiness. As the pamphlet approaches the needle the latter is completing the last stitch in the preceding pamphlet, and is in its uppermost position, so that the knotter hook 148 engages the thread below the needle as shown in Fig. 23; and forms the preliminary loop 141, as shown in Figs. 27 and 28. The end of the new pamphlet having now passed beneath the needle, the latter passes downwardly through the preliminary loop 141, and through the pamphlet, doubling the needle thread downwardly, and forming the loop 142, which is then caught by the beak of the shuttle, as shown in Fig. 32, and carried around the shuttle so that the cop of shuttle thread is passed through the loop. After clearing the shuttle the needle thread is quickly drawn up by the take-up arm 34, drawing the loop 142 backwardly through the loop 141, and bringing the shuttle thread with it in the form of the loop 144, as shown by comparison of Figs. 37 and 38. The tensions upon the needle thread 140 and the shuttle thread 143 are so adjusted as to draw the knot tightly into the condition shown in Fig. 28. These tensions may be adjusted so as to draw the knot into the hole in the pamphlet made by the passage of the needle, or so as to leave the knot upon the inside or the outside of the pamphlet, as may be desired for the appearance of the work. While the stitch is being made and knotted, the pamphlet is driven steadily forward by the feed rolls 18 and 19, at a linear speed suited to the length of stitch required. Thus the stitches are made and securely knotted in rapid succession, and the pamphlet is passed into the bite of the rolls 30 and 35. Up to this time the pamphlet rests upon the angular saddle 11, which serves to guide it accurately in alinement with the needle so that the stitches will be made accurately along the central fold line of the pamphlet. But after the stitches are made, the pamphlets are flattened in passing over the plates 15 and 14, and between the rolls 30 and 35, for convenience in reaching and cutting the connecting threads, to separate the pamphlets, and particularly for convenience in reaching the under thread, which would be difficult to reach with certainty if it lay in the sharp angle of the inner fold line of the pamphlet. As the pamphlets pass between the feed rolls 30 and 35 they support the feeler 270 in the position shown in Fig. 19.

so that the thread cutting mechanism remains inoperative. But at each interval between the pamphlets the feeler 270 drops to the position of Fig. 20, and releases the cutting off cam 255, as shown in Fig. 21, which operates as above described in detail, to carry the picker points 226 between their respective threads, and the corresponding sides of the pamphlet; and then to sever those threads, after which the cutting mechanism returns to its resting position and remains there until again started by the signal mechanism. As the feeler 270 returns from the position of Fig. 21 to that of Fig. 19, it drops upon, and is supported by the succeeding pamphlet, until it falls into the succeeding intervals between the pamphlets when the cutting operation is again repeated. The pamphlets after passing through the rolls 176 and 177 slide down upon the delivery plate 195, which assists in folding them, and are delivered into a box or tray or to suitable folding, or other auxiliary mechanism.

The embodiment of this invention herein shown and described is considered preferable for the particular purposes and the particular character of work herein illustrated. It is obvious, however, that the machine may be modified in many ways and that some of the mechanisms herein shown may be employed without the others, or may be employed in combination with other mechanism, adapted to the character, extent or requirements of different forms or kinds of work. For example, the V-shaped form of saddle herein shown $k$ is preferably employed where the work is to be stitched in coincidence with a fold line, and that V-shaped saddle may extend throughout the machine, in cases where it is not necessary or desirable to cut the threads, or even in connection with thread-cutting mechanism which may be adapted to reach and cut the thread lying in the internal angle of the fold. In the case of such a continuous V-shaped saddle the feed rolls may be of the form of the first pair of feed rolls 18 and 19. For other forms of work it may be preferable to use a flat table, upon which the work is fed forward either by means of feed rolls or any other well-known form of feed mechanism, either by a uniform linear movement, as herein shown, or by a step by step motion as in the case of the ordinary sewing machine. Any of these forms of tables may be cast or otherwise made up of plates joined together as herein shown.

In the form of table herein shown, which merges from a V-shaped into a flat form, it will be obvious that the flat surface of the plate 14 need not be horizontal, but may continue upwardly in the plane of the plate 15, or in any desired direction in tangential relation to the roll 30 or the roll 35. Where the length or other characteristics of the work to be done permits of it, the lower feed roll may be dispensed with, it being herein employed for positiveness of operation in feeding short pamphlets. The upper roll 35 would in that case serve mainly as a flattening roll.

The method herein shown of carrying the needle mechanism in a swinging head is susceptible of many adaptations. The extent of swing and the timing of its swinging movement may be modified to suit any desired method, or time of feeding the work through the machine, and the timing and extent of movement may be changed by removing the cam 97 and substituting another having the desired contour.

We claim as our invention:—

1. A supporting table for the purpose specified, comprising a V-shaped saddle portion, merging into a flat inclined surface extending above the plane of the apex of the V-portion.

2. A supporting table for the purpose specified, comprising a V-shaped saddle portion, merging into a flat inclined surface extending above the plane of the apex of the V-portion, and curving thence into a plane surface approximately parallel with the line of the apex of the V-portion.

3. A supporting and feeding table for the purpose specified comprising a V-shaped saddle portion merging into a flat inclined surface, extending above the plane of the apex of the V-portion, and a pair of feed rolls having a V-shaped driving contour for feeding the pamphlet along the V-shaped surface of the former.

4. The combination with a flattening roll of a supporting table having a substantially flat surface arranged in substantially tangential relation to the circle of the roll, and a V-shaped saddle portion having the line of its apex merging into the flat plate at an angle thereto, and in substantially tangential relation to the circle of the flattening roll.

5. A supporting and feeding table comprising a V-shaped saddle portion merging into a flat inclined surface extending above the plane of the apex of the V-portion, and a pair of cylindrical rolls meeting substantially in the plane of the inclined surface, the circle of the upper roll being in a substantially tangential relation with the line of the apex of the V-shaped portion.

6. A supporting and feeding table for the purpose specified, comprising a V-shaped saddle portion merging into a flat surface inclined to the line of the apex of the saddle, a pair of V-shaped feeding rolls meeting in substantial coincidence with the V-shaped surface of the saddle, and a flattening roll located adjacent to the point of intersection between the line of the apex of the saddle and the surface of the flat plate, with its circle in substantially tangential relation thereto.

7. A supporting and feeding table comprising a V-shaped saddle portion merging into a flat inclined surface, extending above the apex of the V-portion, and curving thence into a flat surface bove and approximately parallel with the plane of the apex of the V-portion, a pair of V-shaped feed rolls, meeting in substantial conformity with the V-shaped surface of the saddle, and a pair of flattening and feeding rolls, meeting substantially at the point of intersection between the apex of the saddle and the flat inclined surface, the upper flattening roll being arranged in substantially tangential relation to the apex of the saddle, and the inclined surface, and the circle of the lower roll being arranged in substantial conformity with the curve of the flat plate beyond that intersection.

8. The combination with a V-shaped work supporting table, of a pair of rotating coengaging feeding rolls, having their driving contours substantially in coincidence with the surface of the table, but relieved at the apex portion of the V-shaped table, and means for positively driving the coengaging portions of the feeding rolls at the desired linear speed of travel of the work.

9. The combination of a work feeding table having a convex V-surface, a pair of rotating feeding rolls having respectively a convex and concave driving surface coengaging substantially in coincidence with the V-surface at the table, but relieved at the apex portion of the table, and means for positively driving the coengaging surface of the rolls at the required linear speed of travel of the work.

10. The combination of a convex V-shaped pamphlet supporting table, a feed roll having a convex driving contour established in substantial coincidence with the V-shaped contour of the table, a yieldingly mounted feed roll having a corresponding concave driving surface for engaging with the first roll, the meeting contour of the rolls being relieved at the apex portion of the table so as to coengage at two portions of their contour at equal distances each side of the apex of the V-contour, and means for driving the coengaging portions of the rolls at the required linear feed of the pamphlets.

11. In combination, a pair of positively driven coöperating feed rolls comprising a lower convex roll, an upper concave roll engaging therewith, gear wheels appurtenant to the two rolls, an arm mounted for oscillatory movement, with the upper roll and its gear journaled thereon, a rotating driving gear journaled concentrically with the axis of oscillation of the arm, and engaging with the gear of the upper roll, and intermediate gearing for connecting the two rolls, whereby they are both driven positively while permitting them to move toward and from each other.

12. The combination with a V-shaped supporting table, of a pair of geared rolls journaled respectively above and below the top surface of the table and having V-shaped coengaging contours, an arm mounted for oscillatory movement, and having one of the said feed rolls and its gear mounted thereon, a driving gear journaled concentrically with the axis of oscillation of the arm, and intermediate gearing connecting the driving gear with the geared roll at the other side of the table, for driving the two rolls positively and with equal speed at their co-engaging portions while permitting them to move toward and from each other.

13. The combination with a supporting table, of a rotating driving gear, a plurality of feed rolls, provided with gears meshing with the driving gear, and a plurality of arms upon which the respective feed rolls and their gears are mounted, the arms being journaled for oscillation concentrically with each other and with the driving gear.

14. The combination of the driving shaft 45, the driving gear 46, the arms 37 and 42, journaled for oscillating movement concentrically with the shaft 45, the gears 38 and 40 meshing with the gear 46, and feed rolls appurtenant to the gears 38 and 40, respectively.

15. In a sewing machine, the combination of means for feeding the work, a needle carrying head journaled for oscillation, means operating through the journal for oscillating the needle head in predetermined relation to the progress of the work, and means also operating through the journal of the head for operating the needle synchronously with the oscillating movement.

16. In a sewing machine, the combination of means for feeding the work at a predetermined rate of movement, a needle carrying head journaled for oscillation, a cam for oscillating the head to move the needle in conformity with the feed of the work, and means operating through the journal of the head for operating the needle synchronously with the movement of the head.

17. In a sewing machine, the combination of means for positively feeding the work at a uniform rate, a needle carrying head journaled for oscillating movement, means operating through the journal of oscillation for oscillating the head to carry the needle in register with the work, and means substantially concentric with the axis of oscillation of the head for operating the needle synchronously with the swinging movement of the head.

18. In a sewing machine, the combination of an oscillating head, needle mechanism and looper mechanism mounted thereon, and driving means substantially concentric with the axis of oscillation of the head for operating the needle and looper mechanisms.

19. In a sewing machine, the combination of an oscillating head, needle mechanism and looper mechanism mounted thereon, means for oscillating the head and driving means substantially coincident with the axis of oscillation of the head for operating the needle and looper mechanisms synchronously with the said oscillations of the head.

20. In a sewing machine, the combination of an oscillating head, needle mechanism and looper mechanism mounted thereon, means for oscillating the head, and a driving shaft journaled substantially concentric with the axis of oscillation of the head, provided with means for operating the needle and looper mechanism synchronously with the oscillations of the head.

21. In a sewing machine, the combination of an oscillating head, needle mechanism and looper mechanism mounted thereon, means for oscillating the head at a predetermined rate, a driving shaft journaled substantially concentric with the axis of oscillation of the head, provided with crank and cam devices for operating the needle and looper mechanisms synchronously with the operations of the head.

22. In a sewing machine, the combination of an oscillating head, needle bar mechanism and looper mechanism mounted thereon, means for oscillating the head at a predetermined rate, a crank shaft journaled substantially concentric with the axis of oscillation of the head for driving the needle mechanism, cam devices mounted to rotate in substantial alinement with the axis of the crank shaft, and driven thereby, for operating the looper mechanism.

23. In a sewing machine, the combination of a head provided with a sleeve, a support in which the sleeve is journaled for oscillation, needle mechanism mounted in the head, means for engaging the sleeve to oscillate the head from the side of the support opposite to the head, and a shaft journaled and extending longitudinally through the sleeve for driving the needle mechanism synchronously with the oscillations of the head.

24. In a sewing machine, the combination of a head provided with a sleeve, a support in which the sleeve is journaled for oscillation, needle mechanism carried on the head, a shaft journaled in, and extending longitudinally through the sleeve, and connected with the needle mechanism, a cam for oscillating the head in its support, and means for rotating the shaft synchronously with the oscillations of the head.

25. In a sewing machine, the combination of a needle carrying head provided with a sleeve, a support in which the sleeve is journaled for oscillation, means for oscillating the head from the opposite end of the support, a driving shaft for the needle mechanism journaled in, and extending longitudinally of the sleeve, and means for rotating the shaft.

26. The combination, in a sewing machine, of means for positively advancing the work through the machine, a needle carrying head mounted to oscillate in the general direction of advance of the work, means operating concentrically with the axis of oscillation of the head for driving the needle mechanism carried by the head, and a cam for oscillating the needle head to carry the needle synchronously with the feed mechanism, and in conformity with the advance of the work while engaged therewith.

27. The combination in a sewing machine, of geared rolls for feeding the work at uniform speed through the machine, an oscillating needle carrying head, means substantially concentric with the axis of oscillation of the head for reciprocating the needle toward and from the work, an arm appurtenant to the head, and a cam engaging with the arm and oscillating the head to carry the needle in conformity with the uniform travel of the work while it is engaged therewith, and synchronously with the reciprocating movements of the needle.

28. The combination in a sewing machine of geared rolls for feeding the work at uniform speed through the machine, an oscillating head, needle mechanism mounted upon the head, a driving shaft for the needle mechanism, journaled concentric with the axis of oscillation of the head, an arm appurtenant to the head and a cam for oscillating the arm to carry the needle in conformity with the work while engaging therewith.

29. The combination in a sewing machine of geared rolls for feeding the work at uniform speed through the machine, needle mechanism, a head upon which the needle mechanism is mounted, provided with a sleeve supported to oscillate in a bearing, means for driving the needle mechanism, communicating therewith through the sleeve-journal of the head, an arm appurtenant to the sleeve, and a cam engaging the arm, for oscillating the arm to carry the needle in substantial conformity with the work while engaging therewith.

30. In knot tying mechanism, the combination of a needle and a shuttle arranged for forming the ordinary lock stitch, a looper, an oscillating carrier on which the looper is rotatably mounted, means for oscillating the carrier, means for rotating the looper including transmitting mechanism mounted on the carrier, and a driver for the transmitting mechanism mounted for swinging movement concentrically with the oscillating carrier.

31. In knot tying mechanism, the combination of a needle and a shuttle arranged for forming the ordinary lock stitch, a looper, an oscillating carrier on which the looper is rotatably mounted, a cam for oscillating the carrier, a cam for rotating the looper, and means including toothed gearing mounted upon the carrier to swing concentrically therewith for transmitting rotary motion to the looper from its cam.

32. The combination of a looper, a pivotally mounted carrier on which the looper is rotatably mounted, means pivotally mounted upon an axis substantially coincident with that of the carrier for rotating the looper, and means for reciprocating the carrier.

33. The combination of a looper, a pivotally mounted arm on which the looper is journaled, an oscillating sector gear, a geared connection between the sector gear and the looper for rotating the latter, and means for reciprocating the carrier.

34. The combination of a looper, a pivotally mounted arm upon which the looper is rotatably mounted, a sector connected by gearing with the looper and pivotally mounted in axial coincidence with the arm, and means for oscillating the arm and sector in predetermined time relation.

35. A knot-tying attachment for sewing machines, including a looper carrier and a looper operating member both mounted for oscillation upon substantially coincident axes, means for oscillating the said carrier and operating member relative to each other, and means for attaching the said parts to a sewing machine head.

36. A knot-tying attachment for sewing machines, including a looper, a swinging carrier on which the looper is mounted for rotation, means for rotating the looper, including a movement transmitting member mounted to swing in substantially concentric relation to the carrier, and means for attaching the said parts to a sewing machine head.

37. A self-contained integrally removable knotting attachment for a sewing machine, comprising a frame adapted to be attached to a sewing machine head, thread looping mechanism mounted on the frame, and means for connection with the sewing machine mechanism, whereby the thread looping mechanism is driven from the sewing machine.

38. A self contained integrally removable attachment for converting a lock stitch sewing machine into a knot tying machine, comprising a frame adapted to be substituted for the face plate of the sewing machine, and thread looping mechanism mounted on the frame for coöperating with the sewing machine mechanism to form knots in the stitches made by the machine.

39. The combination with a reciprocating thread carrying needle, of a looper, an oscillating arm upon which the looper is rotatably mounted, a sector gear pivotally mounted concentrically with the axis of oscillation of the arm, a geared connection between the sector gear and the looper, and means for respectively reciprocating the needle, oscillating the arm, and rotating the looper in predetermined time relation.

40. The combination of a swinging head, a reciprocating needle, and a thread looping mechanism both carried by the swinging head, said looping mechanism comprising an oscillating arm, a looper rotatably mounted on the arm, and means for oscillating the arm and rotating the looper during the swinging movement of the head in time with the operations of the needle.

41. A sewing and looping mechanism comprising a swinging head, a reciprocating needle mounted thereon, a looper arm mounted to oscillate upon the swinging head, a looper rotatably mounted on the arm, a sector gear pivotally mounted in concentric relation with the arm, a geared connection between the sector and the looper, and means for communicating movement through the swinging head to operate the arm and the sector gear.

42. A thread-cutting device for pamphlets comprising a movable carriage resting against and supported by the pamphlets, an arm mounted on the carriage to oscillate transversely of the thread, a picker blade mounted on the arm to swing between the thread and the pamphlet, and separate them, a blade coöperating with an edge of the picker blade to form a shear, means for oscillating the picker arm, and means for operating the shear.

43. A thread-cutting device for pamphlets, comprising a movable carriage supported by the pamphlets, a picker blade mounted upon the carriage to swing between the thread, and the pamphlets, to separate them, blades for coöperating with the edges of the picker blade to form a double shear, means for oscillating the picker blade, and means for operating the shear.

44. The combination with means for feeding sewn pamphlets, of a device for cutting the threads during the travel of the pamphlets, comprising a picker blade having substantially parallel sides forming shear edges and having a pointed end projecting beyond the shear edges, the point being nearer to one shear edge than the other, to compensate for the travel of the pamphlet, during the operation of picking up the thread.

45. The combination in a thread cutting device of a picker blade having shear edges, and a projecting V-point, a pair of blades for coöperating with the shear edges of the picker blade, pivotally mounted blade holders for supporting the blades in engaging relation to the shear edges of the picker, and spring tension devices for pressing the shear blades against the edges of the picker.

46. The combination with work feeding and sewing mechanism, of a thread cutting device, comprising a picker blade having shear edges, and a projecting V-point for picking up the thread, an oscillating arm on which the blade is mounted, shear blades for coöperating with the shear edges of the picker, a single revolution device for oscillating the picker and a signal device operable by the passing work for controlling the time of operation of the thread cutting device.

47. The combination with pamphlet-feeding and sewing mechanism of a thread cutting device comprising a reciprocating shear for cutting the thread, a single revolution device for operating the shear, and a signal device operable by the passing pamphlets for controlling the time of operation of the cutting mechanism.

48. In combination with mechanism for feeding and sewing pamphlets, thread cutting mechanism comprising a reciprocating shear for cutting threads to separate the pamphlets, a single revolution device for operating the shear, and a signal device comprising a feeler for dropping into the intervals between the succeeding pamphlets for inaugurating the thread cutting operation.

49. The combination with means for feeding and sewing pamphlets, of mechanism for cutting the stitches between the pamphlets, comprising a reciprocating shear, means for synchronizing the movement of the shear with the travel of the stitches, and a signal device resting on and held out of operation by the passing pamphlets, and operable by dropping into the intervals between the pamphlets for inaugurating the thread-cutting operation.

50. In combination with means for feeding and sewing pamphlets, means for severing the thread at varying planes due to the differing thickness of pamphlets, comprising a thread cutting device, and means for engaging with the surface of the pamphlets to maintain the thread cutting device in uniform cutting relation to the thread.

51. The combination with pamphlet feeding and sewing mechanism of a supporting table for the pamphlets, and thread cutting devices for separating the sewn pamphlets, one of the said cutting devices being mounted to operate in fixed relation to the surface of the table, and the other cutting device being mounted to rest upon the passing pamphlet, whereby each cutting device is maintained in uniform cutting relation to the respective threads of differing thicknesses of pamphlets.

52. The combination with pamphlet feeding and sewing mechanism of thread cutting devices for separating the sewn pamphlets, comprising shears for severing the thread, and means for advancing the cutting devices in coincidence with the travel of the pamphlets during the moment of severing the thread.

53. The combination with pamphlet feeding and sewing mechanism of thread cutting devices for separating the sewn pamphlets, comprising an oscillating shear for severing the thread, and means operable by the oscillation of the shear for advancing it in coincidence with the travel of the thread during the thread cutting movement.

54. The combination with pamphlet feeding and sewing mechanism, of thread-cutting devices for separating the sewn pamphlets, means for synchronizing the movements of the thread-cutting device with the feeding and sewing mechanism, means supported by the pamphlet for holding the thread-cutting devices out of operation during the passage of a pamphlet, and means operable by dropping into the space between the pamphlets for inaugurating the operation of the thread-cutting devices.

55. The combination with pamphlet feeding and sewing mechanism, of thread cutting devices for separating the sewn pamphlets, a single revolution mechanism for operating the thread cutting devices, a feeler resting upon the pamphlets to drop into the intervals between them, and intermediate mechanism for inaugurating the operation of the single revolution device by the dropping of the feeler.

56. In combination with pamphlet feeding and thread cutting mechanism, a signal device for the latter mechanism comprising a rotating clutch, a feeler mounted upon a swinging arm in engaging relation to the clutch, and resting upon the pamphlets, whereby the latter support the feeler out of engaging relation to the clutch, and means for connecting the clutch with the thread-cutting mechanism.

In testimony whereof, we have signed our names to this specification in the presence of two subscribing witnesses.

ALBERT A. STURTEVANT.
WM. H. HONISS.

Witnesses:
JOSEPH MERRITT,
CAROLINE M. BRECKLE.